US011963646B2

(12) United States Patent
Ouazzani

(10) Patent No.: US 11,963,646 B2
(45) Date of Patent: Apr. 23, 2024

(54) HAND CLEANING DEVICE

(71) Applicant: Youssef Ouazzani, Port Richey, FL (US)

(72) Inventor: Youssef Ouazzani, Port Richey, FL (US)

( * ) Notice: Subject to any disclaimer, the term of this patent is extended or adjusted under 35 U.S.C. 154(b) by 41 days.

(21) Appl. No.: 17/585,946

(22) Filed: Jan. 27, 2022

(65) Prior Publication Data

US 2023/0233036 A1    Jul. 27, 2023

(51) Int. Cl.
*A47K 7/04* (2006.01)
*A47K 5/12* (2006.01)
*A47K 10/00* (2006.01)
*A63H 33/00* (2006.01)
*G09B 19/00* (2006.01)

(52) U.S. Cl.
CPC ............. *A47K 7/04* (2013.01); *A47K 5/1217* (2013.01); *A47K 10/00* (2013.01); *A47K 2210/00* (2013.01); *A63H 33/00* (2013.01); *G09B 19/0076* (2013.01)

(58) Field of Classification Search
CPC .............................. A47K 7/04; A47K 2210/00
See application file for complete search history.

(56) References Cited

U.S. PATENT DOCUMENTS

| 1,965,774 | A | * | 7/1934 | Jaynes | A47K 7/04 |
| | | | | | 4/606 |
| 3,439,370 | A | * | 4/1969 | McLaughlin | A47K 7/04 |
| | | | | | 15/4 |
| 3,918,987 | A | * | 11/1975 | Kopfer | A61B 90/80 |
| | | | | | 601/166 |
| 4,130,908 | A | * | 12/1978 | Alcamo | A47K 7/04 |
| | | | | | 15/21.1 |
| 6,161,227 | A | * | 12/2000 | Bargenquast | A47K 5/1217 |
| | | | | | 134/58 R |
| 2008/0099050 | A1 | * | 5/2008 | Barnhill | A61B 90/80 |
| | | | | | 134/18 |
| 2012/0186011 | A1 | * | 7/2012 | Wright | A47K 10/48 |
| | | | | | 4/638 |
| 2019/0387930 | A1 | * | 12/2019 | Fauconnier | A47K 5/1217 |
| 2020/0320846 | A1 | * | 10/2020 | Trapani | G06V 20/52 |
| 2022/0175197 | A1 | * | 6/2022 | Ngo | A61L 2/0088 |

FOREIGN PATENT DOCUMENTS

| CN | 110558886 | * | 7/2019 | ............... A47K 7/04 |
| CN | 111281701 | * | 2/2020 | ............... A47K 7/04 |
| CN | 211883556 | * | 3/2020 | |

* cited by examiner

*Primary Examiner* — J C Jacyna
(74) *Attorney, Agent, or Firm* — The Iwashko Law Firm, PLLC; Lev Ivan Gabriel Iwashko

(57) ABSTRACT

A hand cleaning device, including a main body, including a cleaning section to store at least one liquid therein, and a drying section disposed on at least a portion of the cleaning section to facilitate movement of air therein, a cleaning unit disposed on and within at least a portion of the cleaning section to spray at least one liquid within the cleaning section in response to detecting movement within the cleaning section, a scrubbing unit disposed within at least a portion of the cleaning section to scrub using a cleaning agent, and a drying unit disposed within at least a portion of the drying section to blow the air within the drying section in response to detecting movement within the drying section.

6 Claims, 3 Drawing Sheets

HAND CLEANING DEVICE

BACKGROUND

1. Field

The present general inventive concept relates generally to a cleaning device, and particularly, to a hand cleaning device.

2. Description of the Related Art

Cleaning a person's hands is an important regimen for proper hygiene. In many cases, cleaning the hands can be the difference between staying healthy and becoming infected by a pathogen (e.g., bacteria, virus, fungus, parasite) depending on what the hands have been in contact with over time.

Children tend to disregard their own personal hygiene in absence of guidance from parents. It takes time, patience, and a lot of physical work from the parents to support a child to develop hand-washing skills. Moreover, children often require regular reminders and/or parental assistance when cleaning their hands, which can quickly become both time-consuming and challenging for the parents. Notably, most children learn best when an activity is interactive and/or playful. Yet, most parents often struggle to find fun and exciting alternative teaching methods.

Therefore, there is a need for a hand cleaning device that educates the child of the importance of hand cleaning while making the experience enjoyable and interactive.

SUMMARY

The present general inventive concept provides a hand cleaning device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a hand cleaning device, including a main body, including a cleaning section to store at least one liquid therein, and a drying section disposed on at least a portion of the cleaning section to facilitate movement of air therein, a cleaning unit disposed on and within at least a portion of the cleaning section to spray at least one liquid within the cleaning section in response to detecting movement within the cleaning section, a scrubbing unit disposed within at least a portion of the cleaning section to scrub using a cleaning agent, and a drying unit disposed within at least a portion of the drying section to blow the air within the drying section in response to detecting movement within the drying section.

The main body may further include a center divider disposed between the cleaning section and the drying section to prevent the at least one liquid within the cleaning section from entering the drying section.

The cleaning unit may include a plurality of hand receiving apertures to receive at least one hand therethrough, a plurality of cleaning barriers movably disposed on at least a portion of each of the plurality of hand receiving apertures to move from closed over at least one of the plurality of hand receiving apertures in a first position to at least partially opened away from at least one of the plurality of hand receiving apertures in a second position, and move from opened away from at least one of the plurality of hand receiving apertures in the second position to closed over at least one of the plurality of hand receiving apertures in the first position, a cleaning sensor disposed within at least a portion of the cleaning section, and a plurality of nozzles disposed within at least a portion of the cleaning section to spray the at least one liquid within the cleaning section in response to the cleaning sensor detecting movement in at least one of the plurality of hand receiving apertures and within the cleaning section.

The scrubbing unit may include a motor disposed within at least a portion of the cleaning section, a plurality of pistons disposed on at least a portion of the motor to move in response to a rotation of the motor, and a plurality of sponges disposed on each of the plurality of pistons to scrub in response to movement of the plurality of pistons.

The drying unit may include a drying aperture disposed within at least a portion of the drying section to receive at least one hand therethrough, a drying barrier movably disposed on at least a portion of the drying aperture to move from closed over the drying aperture in a first position to at least partially opened away from the drying aperture in a second position, and move from opened away from the drying aperture in the second position to closed over the drying aperture in the first position, a drying sensor disposed within at least a portion of the drying section, and a fan disposed within at least a portion of the drying section to blow the air within the drying section in response to the drying sensor detecting movement in at least one of the drying aperture and within the drying section.

The hand cleaning device may further include a plurality of speakers disposed on at least a portion of the cleaning section to may emit at least one sound in response to the cleaning unit detecting movement within the cleaning section, and emit another at least one sound in response to the drying unit completing blowing the air.

The hand cleaning device may further include a figure assembly disposed within at least a portion of the cleaning section and the drying section to extract a figurine from within the cleaning section in response to the cleaning unit detecting movement within the cleaning section.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
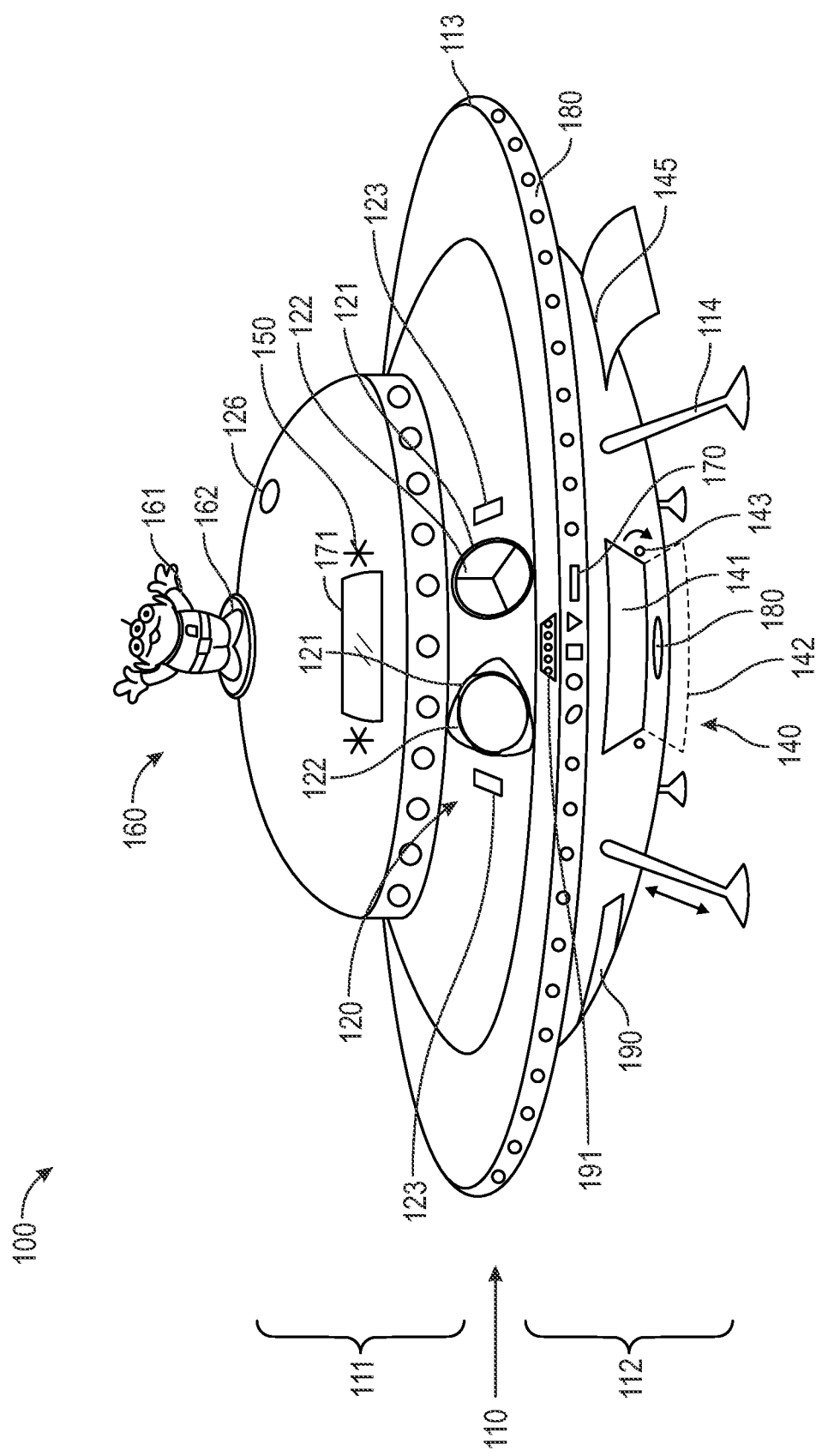
FIG. 1 illustrates a front perspective view of a hand cleaning device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Hand Cleaning Device 100
Main Body 110
Cleaning Section 111
Drying Section 112
Center Divider 113
Legs 114
Liquid Outlet 115
Cleaning Unit 120
Hand Receiving Apertures 121
Cleaning Barriers 122
Cleaning Sensor 123
Nozzles 124
Liquid Pump 125
Cleaning Agent Container 126
Heating Unit 127
Scrubbing Unit 130
Motor 131
Pistons 132
Sponges 133
Drying Unit 140
Drying Aperture 141
Drying Barrier 142
Drying Sensor 143
Fan 144
Towel Dispenser 145
Speakers 150
Figure Assembly 160
Figurine 161
Platform 162
Movable Rod 163
Control Panel 170
Display Unit 171
Lights 180
Power Source 190
Power Indicator 191
Charging Unit 200
Charging Body 210
Power Cord 220

FIG. 1 illustrates a front perspective view of a hand cleaning device 100, according to an exemplary embodiment of the present general inventive concept.

Figure 2:
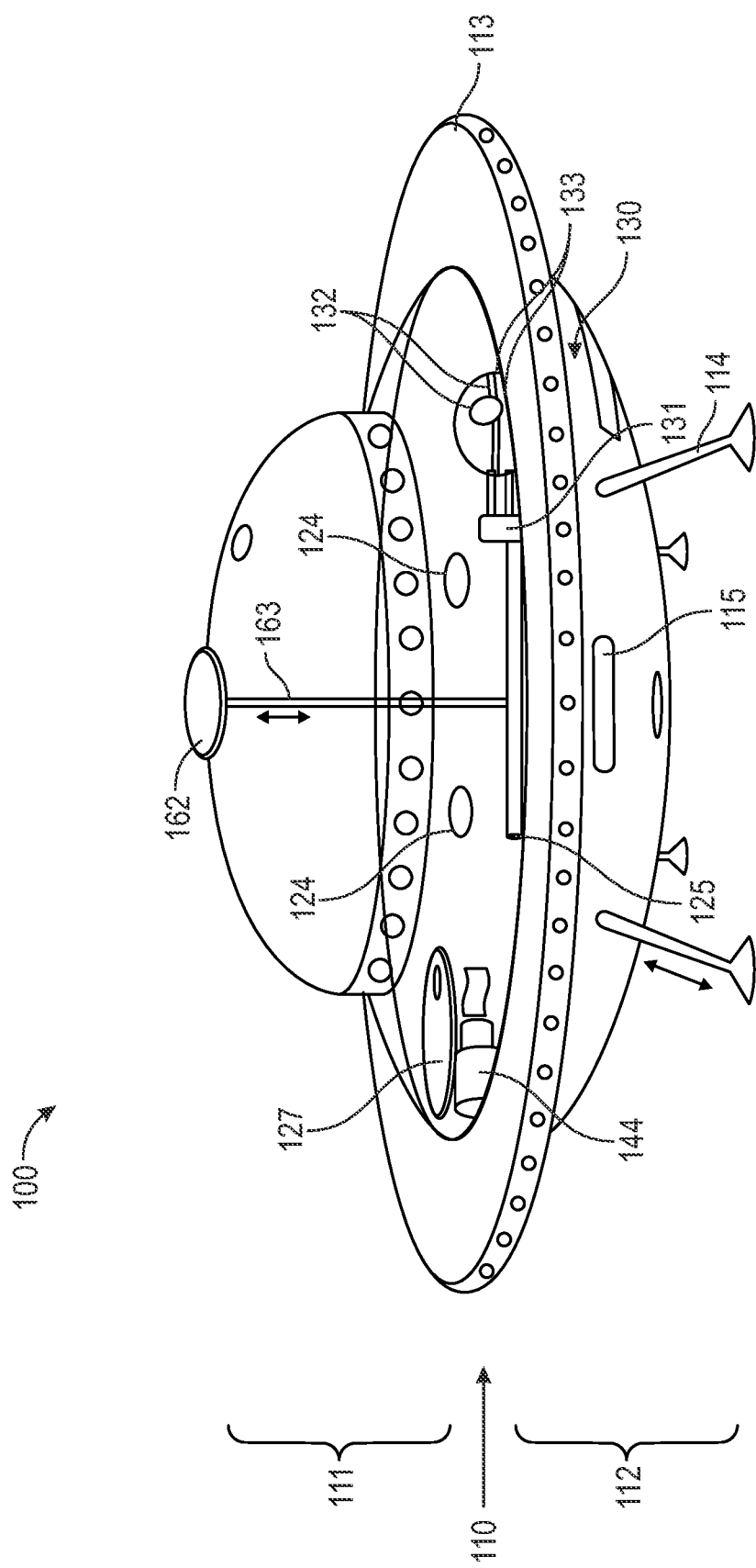
FIG. 2 illustrates a rear perspective view of the hand cleaning device, according to an exemplary embodiment of the present general inventive concept.

FIG. 2 illustrates a rear perspective view of the hand cleaning device 100, according to an exemplary embodiment of the present general inventive concept.

Figure 3:
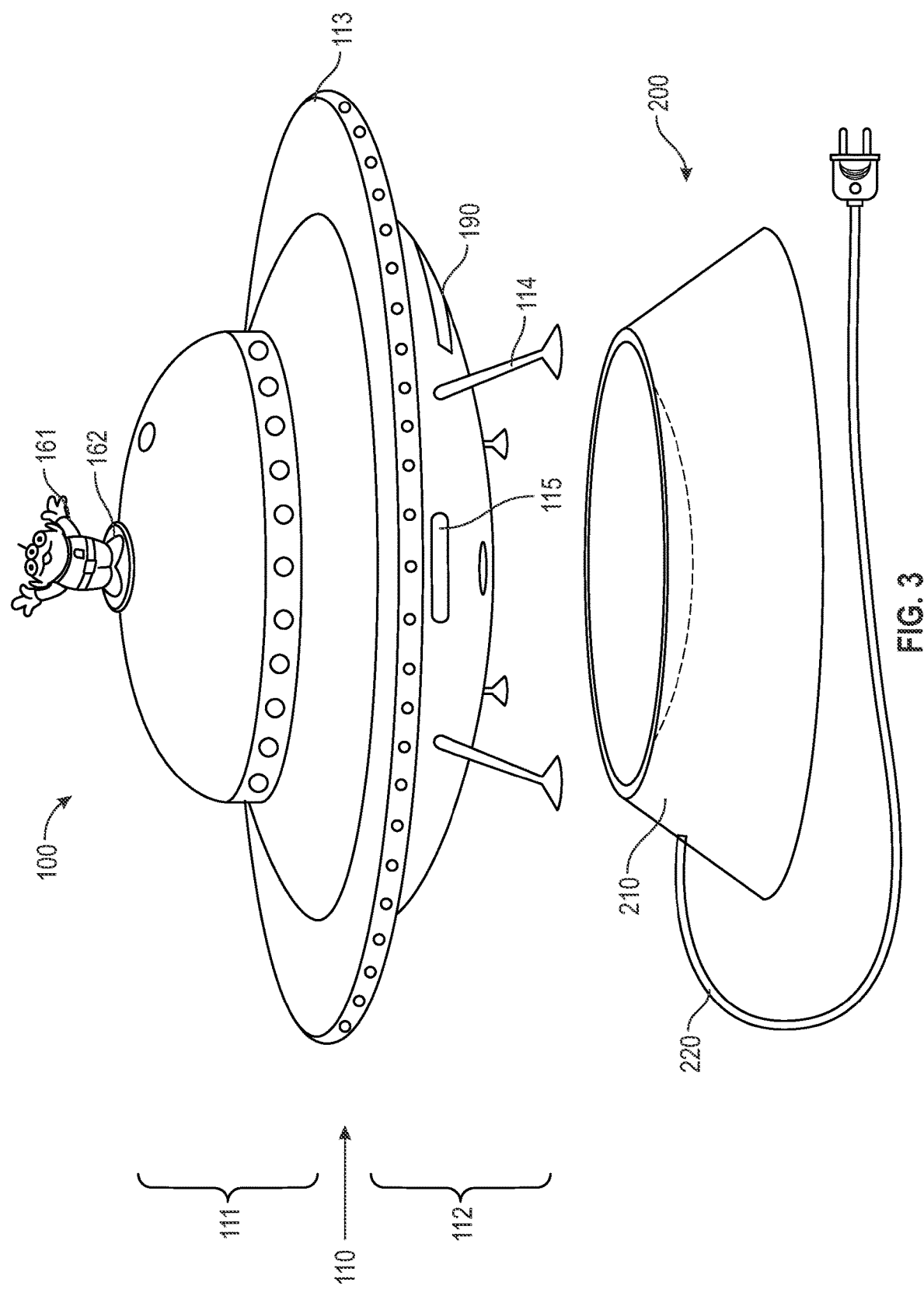
FIG. 3 illustrates a rear perspective view of the hand cleaning device with a charging unit, according to an exemplary embodiment of the present general inventive concept.

FIG. 3 illustrates a rear perspective view of the hand cleaning device 100 with a charging unit 200, according to an exemplary embodiment of the present general inventive concept.

The hand cleaning device 100 may be constructed from at least one of metal, plastic, wood, and rubber, etc., but is not limited thereto.

The hand cleaning device 100 may include a main body 110, a cleaning unit 120, a scrubbing unit 130, a drying unit 140, a plurality of speakers 150, a figure assembly 160, a control panel 170, a plurality of lights 180, a power source 190, and a charging unit 200, but is not limited thereto.

Referring to FIGS. 1 through 3, the main body 110 is illustrated to have a UFO shape. However, the main body 110 may be an airplane, a car, a truck, a spaceship, a building, a landmark, or any other shape known to one of ordinary skill in the art, but is not limited thereto.

The main body 110 may include a cleaning section 111, a drying section 112, a center divider 113, a plurality of legs 114, and a liquid outlet 115, but is not limited thereto.

The cleaning section 111 may be a first chamber. Moreover, the cleaning section 111 may store at least one liquid (e.g., water, soap, cleaning detergent, etc.) therein. However, the cleaning section 111 may have a divider therein to separate different liquids, such as water from soap.

The drying section 112 may be a second chamber disposed on at least a portion of the cleaning section 111. However, the drying section 112 may be separated from the cleaning section 111 to facilitate movement of air therein.

The center divider 113 may be disposed between the cleaning section 111 and/or the drying section 112. The center divider 113 may appear to be an outer circular surface of the main body 110 (i.e., outer rim of the UFO), such that the center divider 113 may have a diameter greater than a diameter of the cleaning section 111 and/or a diameter of the drying section 112 with respect to a top view and/or a bottom view of the main body 110. The center divider 113 may separate the cleaning section 111 from the drying section 112, such that the center divider 113 may prevent the at least one liquid within the cleaning section 111 from entering the drying section 112. It is important to note that the center divider 113 may be different and distinct from the divider within the cleaning section 111 to separate liquids (e.g., water and soap).

Each of the plurality of legs 114 may include a rubber base, but is not limited thereto.

The plurality of legs 114 may be movably (i.e., slidably) disposed within at least a portion of the cleaning section 111 and/or the drying section 112. More specifically, each of the plurality of legs 114 may move from retracted within the cleaning section 111 and/or the drying section 112 in a first position to at least partially extended away from the cleaning section 111 and/or the drying section 112 in a second position. Subsequently, each of the plurality of legs 114 may move from extended away from the cleaning section 111 and/or the drying section 112 in the second position to retracted within the cleaning section 111 and/or the drying section 112 in the first position.

Furthermore, the rubber base of each of the plurality of legs 114 may prevent lateral movement of each of the plurality of legs 114 while disposed on a surface (e.g., a table, a countertop, a desk, a floor, etc.). In other words, the rubber base of each of the plurality of legs 114 may prevent each of the plurality of legs 114 from slipping and stay sturdy.

The liquid outlet 115 may include a channel and a door, but is not limited thereto.

The liquid outlet 115 may be disposed on at least a portion of the drying section 112. The liquid outlet 115 may connect the cleaning section 111 to an external environment. Accordingly, the liquid outlet 115 may allow the at least one liquid within the cleaning section 111 to be extracted to the external environment. In other words, the liquid outlet 115 may allow the at least one liquid to be poured out from the cleaning section 111 after use.

The cleaning unit 120 may include a plurality of hand receiving apertures 121, a plurality of cleaning barriers 122, a cleaning sensor 123, a plurality of nozzles 124, a liquid pump 125, a cleaning agent container 126, and a heating unit 127, but is not limited thereto.

Each of the plurality of hand receiving apertures 121 may be constructed of silicone to create a smooth and/or gentle sensation to touch. The plurality of hand receiving apertures 121 may be disposed on at least a portion of the cleaning section 111. Each of the plurality of hand receiving apertures 121 may receive at least one hand therethrough.

The plurality of cleaning barriers 122 may be movably (i.e., pivotally, rotatably) disposed on at least a portion of each of the plurality of hand receiving apertures 121. The plurality of cleaning barriers 122 may be divided into three sections covering each of the plurality of hand receiving apertures 121. Additionally, each of the plurality of cleaning barriers 122 may move from closed over at least one of the plurality of hand receiving apertures 121 in a first position to at least partially opened away from at least one of the plurality of hand receiving apertures 121 in a second position. Conversely, each of the plurality of cleaning barriers 122 may move from opened away from at least one of the plurality of hand receiving apertures 121 in the second position to closed over at least one of the plurality of hand receiving apertures 121 in the first position. Furthermore, each of the plurality of cleaning barriers 122 may move independently with respect to each other and/or simultaneously. Also, each of the plurality of cleaning barriers 122 may prevent injury to the at least one hand due to the plurality of cleaning barriers 122 being divided.

The cleaning sensor 123 may be disposed within at least a portion of the cleaning section 111. The cleaning sensor 123 may detect movement through at least one of the plurality of hand receiving apertures 121 and/or within the cleaning section 111.

The plurality of nozzles 124 may be disposed within at least a portion of the cleaning section 111 and/or connected to the at least one liquid within the cleaning section 111. Each of the plurality of nozzles 124 may spray at least one liquid within the cleaning section 111 in response to the cleaning sensor 123 detecting movement through each of the plurality of hand receiving apertures 121 and/or within the cleaning section 111. For example, the plurality of nozzles 124 may clean and/or rinse the at least one hand after the at least one hand been inserted through at least one of the plurality of hand receiving apertures 121. Also, the plurality of nozzles 124 may clean and/or rinse the at least one hand for a first predetermined period of time (e.g., twenty seconds, ten seconds, thirty seconds, etc.).

The liquid pump 125 may be disposed within at least a portion of the cleaning section 111 and/or connected to the plurality of nozzles 124. The liquid pump 125 may pump the at least one liquid within the cleaning section 111 toward the plurality of nozzles 124. Moreover, the liquid pump 125 may pump the at least one liquid in response to the cleaning sensor 123 detecting movement through each of the plurality of hand receiving apertures 121 and/or within the cleaning section 111.

The cleaning agent container 126 may be disposed on and/or within at least a portion of the cleaning section 111. The cleaning agent container 126 may store soap, detergent, sanitizer, and/or any other cleaning agent known to one of ordinary skill in the art. The cleaning agent container 126 may dispense soap after the plurality of nozzles 124 have completed cleaning and/or rinsing the at least one hand for the first predetermined period of time.

The heating unit 127 may include a heating coil and a heating pad, but is not limited thereto.

The heating unit 127 may be disposed within at least a portion of the cleaning section 111. The heating unit 127 may increase a temperature level of the at least one liquid in response to turning on. As such, the heating unit 127 may enhance comfort of the at least one liquid during cleaning.

The scrubbing unit 130 may include a motor 131, a plurality of pistons 132, and a plurality of sponges 133, but is not limited thereto.

The motor 131 may be disposed within at least a portion of the cleaning section 111.

The plurality of pistons 132 may be disposed on at least a portion of the motor 131. The pistons 132 may move in response to a rotation of the motor 131.

Each of the plurality of sponges 133 may be disposed on at least one of the plurality of pistons 132. Moreover, the plurality of sponges 133 may move in response to movement of the plurality of pistons 132. As such, the plurality of sponges 133 may scrub and/or lather the soap dispensed from the cleaning agent container 126 after contacting the at least one hand. The motor 131 may move the plurality of sponges 133 to scrub the at least one hand for a second predetermined period of time (e.g., thirty seconds, twenty seconds, forty seconds, etc.).

After the plurality of sponges 133 have moved for the second predetermined period of time, the plurality of nozzles 124 may spray the at least one liquid to clean and/or rinse the at least one hand for a third predetermined period of time (e.g., ten seconds, twenty seconds) to rinse off the soap.

The drying unit 140 may include a drying aperture 141, a drying barrier 142, a drying sensor 143, a fan 144, and a towel dispenser 145, but is not limited thereto.

The drying aperture 141 may be disposed within at least a portion of the drying section 112. The drying aperture 141 may receive the at least one hand therethrough.

The drying barrier 142 may be movably (i.e., slidably) disposed on at least a portion of the drying aperture 141. Additionally, the drying barrier 142 may move from closed over the drying aperture 141 in a first position to at least partially opened away from the drying aperture 141 in a second position. Conversely, the drying barrier 142 may move from opened away from the drying aperture 141 in the second position to closed over the drying aperture 141 in the first position. It is important to note that the drying barrier 142 may slide downward into the drying section 112 to open.

The drying sensor 143 may be disposed within at least a portion of the drying section 112. The drying sensor 143 may detect movement through the drying aperture 141 and/or within the drying section 112.

The fan 144 may be disposed within at least a portion of the drying section 112. The fan 144 may blow the air within the drying section 112 in response to the drying sensor 143 detecting movement through the drying aperture 141 and/or within the drying section 112. In other words, the fan 144 may blow the air to dry the at least one hand for a third predetermined period of time (e.g., ten seconds, twenty seconds).

The towel dispenser 145 may be disposed on at least a portion of the drying section 112. The towel dispenser 145 may store at least one roll of towel thereon, such that at least one towel on the towel dispenser 145 may be extracted therefrom.

The plurality of speakers 150 may be disposed on at least a portion of the cleaning section 111 and/or the drying section 112. The plurality of speakers 150 may emit at least one sound in response to the cleaning sensor 123 detecting movement through at least one of the plurality of hand receiving apertures 121 and/or within the cleaning section 111. For example, the plurality of speakers 150 may emit the at least one sound of the UFO landing followed by music and/or at least one voice describing importance and/or benefits of washing hands to educate a user. Subsequently, the plurality of speakers 150 may emit the at least one sound of the UFO taking off after the fan 144 has completed blowing the air for the third predetermined period of time and/or the drying sensor 143 detects the at least one hand has been extracted from the drying section 112.

The figure assembly 160 may include a figurine 161, a platform 162, and a movable rod 163, but is not limited thereto.

The figurine 161 may be an alien, a person, an animal, any/or any other type of figure known to one of ordinary skill in the art.

The platform 162 may receive the figurine 161 thereon.

The movable rod 163 may be telescopically disposed within at least a portion of a center of the cleaning section 111 and/or the drying section 112. The movable rod 163 may be connected to a figure motor. As such, the movable rod 163 may move from retracted within the cleaning section 111 and/or the drying section 112 in a first position to at least partially extended out of the cleaning section 111 in a second position. Conversely, the movable rod 163 may move from extended out of the cleaning section 111 in the second position to retracted within the cleaning section 111 and/or the drying section 112 in the first position. As such, the figurine 161 may protrude out of the cleaning section 111 while the movable rod 163 is at least partially extended. Furthermore, the movable rod 163 may move to at least partially extended in response to the cleaning sensor 123 detecting movement through at least one of the plurality of hand receiving apertures 121 and/or within the cleaning section 111, such that the plurality of nozzles 124 have started a cleaning cycle. As such, the figurine 161 may appear to be talking to the user during washing of the at least one hand. However, the movable rod 163 may move to retracted within the cleaning section 111 and/or the drying section 112 after the fan 144 has completed blowing the air for the third predetermined period of time and/or the drying sensor 143 detects the at least one hand has been extracted from the drying section 112.

The control panel 170 may include a display unit 171, but is not limited thereto.

The control panel may further include an input unit (e.g., buttons, switches, levers), a processing unit (e.g., a microprocessor, a central processing unit (CPU), a microcontroller), and a storage unit (e.g., a hard disk drive, a solid state drive, a cloud storage driver, a flash driver, a random access memory (RAM)), but is not limited thereto.

The control panel 170 may be disposed on at least a portion of the center divider 113. The control panel 170 may control the cleaning unit 120, the scrubbing unit 130, the drying unit 140, the plurality of speakers 150, and/or the figure assembly 160.

The control panel 170 may receive input to turn on and/or turn off any of the aforementioned components.

The display unit 171 may include a plasma screen, an LCD screen, a light emitting diode (LED) screen, an organic LED (OLED) screen, a computer monitor, a hologram output unit, a sound outputting unit, or any other type of device that visually or aurally displays data. Also, the display unit 122 may be a touch-screen that receives an input thereon.

The display unit 171 may be disposed on at least a portion of the cleaning section 171. The display unit 171 may display instructions for cleaning hands thereon.

The plurality of lights 180 may include a light bulb, an incandescent bulb, a light-emitting diode (LED), a fluorescent bulb, and a halogen lamp, but is not limited thereto.

The plurality of lights 180 may be disposed on at least a portion of the cleaning section 111 and/or the drying section 112. The plurality of lights 180 may illuminate in response to the cleaning sensor 123 detecting movement through each of the plurality of hand receiving apertures 121 and/or within the cleaning section 111. Additionally, the plurality of lights 180 may turn off in response to the fan 144 having completed blowing the air for the third predetermined period of time and/or the drying sensor 143 detecting the at least one hand has been extracted from the drying section 112. Alternatively, the lights 180 may be manually controlled from the control panel 170.

The power source 190 may include a power indicator 191, but is not limited thereto.

Furthermore, the power source 190 may be a battery and a solar cell, but is not limited thereto.

The power source 190 may be disposed within at least a portion of the cleaning section 111 and/or the drying section 112. The power source 190 may provide power to the cleaning unit 120, the scrubbing unit 130, the drying unit 140, the plurality of speakers 150, the figure assembly 160, the control panel 170, and/or the plurality of lights 180.

The power indicator 191 may be disposed on at least a portion of the cleaning section 111 and/or the drying section 112. The power indicator 191 may display a power level within the power source 190. For example, the power indicator 191 may display the power level remaining of the battery.

The charging unit 200 may include a charging body 210 and a power cord 220, but is not limited thereto.

The charging body 210 may be removably connected to at least portion of the drying section 112. In other words, the charging body 210 may receive the drying section 112 thereon. As such, the charging body 210 may charge the power source 190 in response to connecting to the drying section 112.

The power cord 220 may be disposed on at least a portion of the charging body 210. The power cord 220 may removably connect to an external power source (e.g., a power outlet). As such, the power cord 220 may provide power to the charging body 210.

Therefore, the hand cleaning device 100 may provide an entertaining hand cleaning experience due to the figure assembly 160. Also, the hand cleaning device 100 may educate a user of the importance of hand cleaning.

The present general inventive concept may include a hand cleaning device 100, including a main body 110, including a cleaning section 111 to store at least one liquid therein, and a drying section 112 disposed on at least a portion of the cleaning section 111 to facilitate movement of air therein, a cleaning unit 120 disposed on and within at least a portion of the cleaning section 111 to spray at least one liquid within the cleaning section 111 in response to detecting movement within the cleaning section 111, a scrubbing unit 130 disposed within at least a portion of the cleaning section 111 to scrub using a cleaning agent, and a drying unit 140 disposed within at least a portion of the drying section 112 to blow the air within the drying section 112 in response to detecting movement within the drying section 112.

The main body 110 may further include a center divider 113 disposed between the cleaning section 111 and the drying section 112 to prevent the at least one liquid within the cleaning section 111 from entering the drying section 112.

The cleaning unit 120 may include a plurality of hand receiving apertures 121 to receive at least one hand therethrough, a plurality of cleaning barriers 122 movably disposed on at least a portion of each of the plurality of hand receiving apertures 121 to move from closed over at least one of the plurality of hand receiving apertures 121 in a first position to at least partially opened away from at least one of the plurality of hand receiving apertures 121 in a second position, and move from opened away from at least one of the plurality of hand receiving apertures 121 in the second position to closed over at least one of the plurality of hand receiving apertures 121 in the first position, a cleaning sensor 123 disposed within at least a portion of the cleaning section 111, and a plurality of nozzles 124 disposed within at least a portion of the cleaning section 111 to spray the at least one liquid within the cleaning section 111 in response to the cleaning sensor 123 detecting movement in at least one of the plurality of hand receiving apertures 121 and within the cleaning section 111.

The scrubbing unit 130 may include a motor 131 disposed within at least a portion of the cleaning section 111, a plurality of pistons 132 disposed on at least a portion of the motor 131 to move in response to a rotation of the motor 131, and a plurality of sponges 133 disposed on each of the plurality of pistons 132 to scrub in response to movement of the plurality of pistons 132.

The drying unit 140 may include a drying aperture 141 disposed within at least a portion of the drying section 112 to receive at least one hand therethrough, a drying barrier 142 movably disposed on at least a portion of the drying aperture 141 to move from closed over the drying aperture 141 in a first position to at least partially opened away from the drying aperture 141 in a second position, and move from opened away from the drying aperture 141 in the second position to closed over the drying aperture 141 in the first position, a drying sensor 143 disposed within at least a portion of the drying section 112, and a fan 144 disposed within at least a portion of the drying section 112 to blow the air within the drying section 122 in response to the drying sensor 143 detecting movement in at least one of the drying aperture 141 and within the drying section 112.

The hand cleaning device 100 may further include a plurality of speakers 150 disposed on at least a portion of the cleaning section 111 to may emit at least one sound in response to the cleaning unit 120 detecting movement within the cleaning section 111, and emit another at least one sound in response to the drying unit 140 completing blowing the air.

The hand cleaning device 100 may further include a figure assembly 160 disposed within at least a portion of the cleaning section 111 and the drying section 112 to extract a figurine 161 from within the cleaning section 111 in response to the cleaning unit 120 detecting movement within the cleaning section 111.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:
1. A hand cleaning device, comprising:
a main body, comprising:
a cleaning section to store at least one liquid therein, and
a drying section disposed on at least a portion of the cleaning section to facilitate movement of air therein;
a cleaning unit disposed on and within at least a portion of the cleaning section to spray at least one liquid within the cleaning section in response to detecting movement within the cleaning section;
a scrubbing unit disposed within at least a portion of the cleaning section to scrub using a cleaning agent, the scrubbing unit comprising:
a motor disposed within at least a portion of the cleaning section;
a plurality of pistons disposed on at least a portion of the motor to move in response to a rotation of the motor, and
a plurality of sponges disposed on each of the plurality of pistons to scrub in response to movement of the plurality of pistons; and
a drying unit disposed within at least a portion of the drying section to blow the air within the drying section in response to detecting movement within the drying section.
2. The hand cleaning device of claim 1, wherein the main body further comprises:
a center divider disposed between the cleaning section and the drying section to prevent the at least one liquid within the cleaning section from entering the drying section.

3. The hand cleaning device of claim 1, wherein the cleaning unit comprises:
- a plurality of hand receiving apertures to receive at least one hand therethrough;
- a plurality of cleaning barriers movably disposed on at least a portion of each of the plurality of hand receiving apertures to move from closed over at least one of the plurality of hand receiving apertures in a first position to at least partially opened away from at least one of the plurality of hand receiving apertures in a second position, and move from opened away from at least one of the plurality of hand receiving apertures in the second position to closed over at least one of the plurality of hand receiving apertures in the first position;
- a cleaning sensor disposed within at least a portion of the cleaning section; and
- a plurality of nozzles disposed within at least a portion of the cleaning section to spray the at least one liquid within the cleaning section in response to the cleaning sensor detecting movement in at least one of the plurality of hand receiving apertures and within the cleaning section.

4. The hand cleaning device of claim 1, wherein the drying unit comprises:
- a drying aperture disposed within at least a portion of the drying section to receive at least one hand therethrough;
- a drying barrier movably disposed on at least a portion of the drying aperture to move from closed over the drying aperture in a first position to at least partially opened away from the drying aperture in a second position, and move from opened away from the drying aperture in the second position to closed over the drying aperture in the first position;
- a drying sensor disposed within at least a portion of the drying section; and
- a fan disposed within at least a portion of the drying section to blow the air within the drying section in response to the drying sensor detecting movement in at least one of the drying aperture and within the drying section.

5. The hand cleaning device of claim 1, further comprising:
- a plurality of speakers disposed on at least a portion of the cleaning section to may emit at least one sound in response to the cleaning unit detecting movement within the cleaning section, and emit another at least one sound in response to the drying unit completing blowing the air.

6. A hand cleaning device, comprising:
- a main body, comprising:
  - a cleaning section to store at least one liquid therein, and
  - a drying section disposed on at least a portion of the cleaning section to facilitate movement of air therein;
- a cleaning unit disposed on and within at least a portion of the cleaning section to spray at least one liquid within the cleaning section in response to detecting movement within the cleaning section;
- a scrubbing unit disposed within at least a portion of the cleaning section to scrub using a cleaning agent;
- a drying unit disposed within at least a portion of the drying section to blow the air within the drying section in response to detecting movement within the drying section; and
- a figure assembly disposed within at least a portion of the cleaning section and the drying section to extract a figurine from within the cleaning section in response to the cleaning unit detecting movement within the cleaning section.

* * * * *